UNITED STATES PATENT OFFICE.

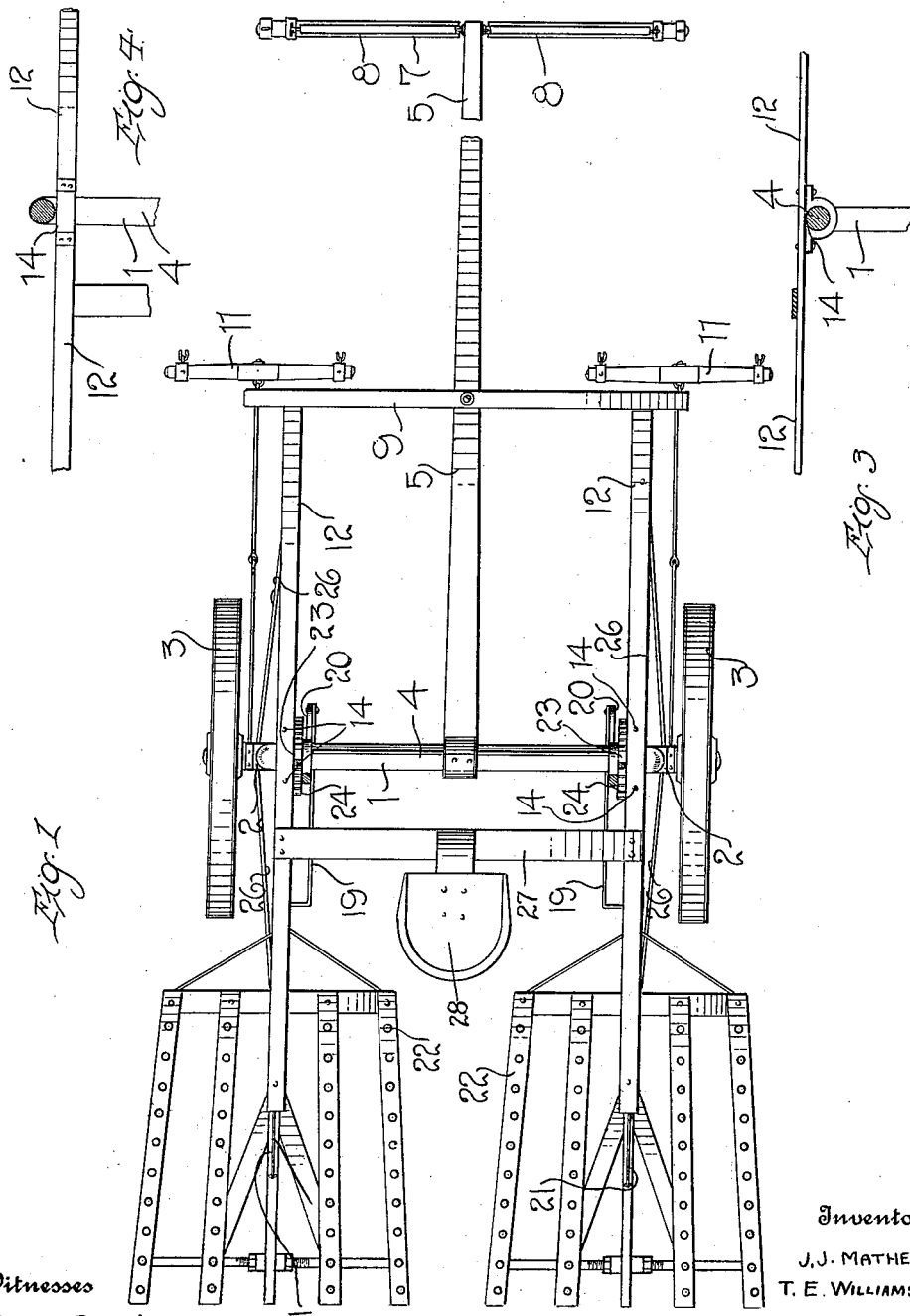

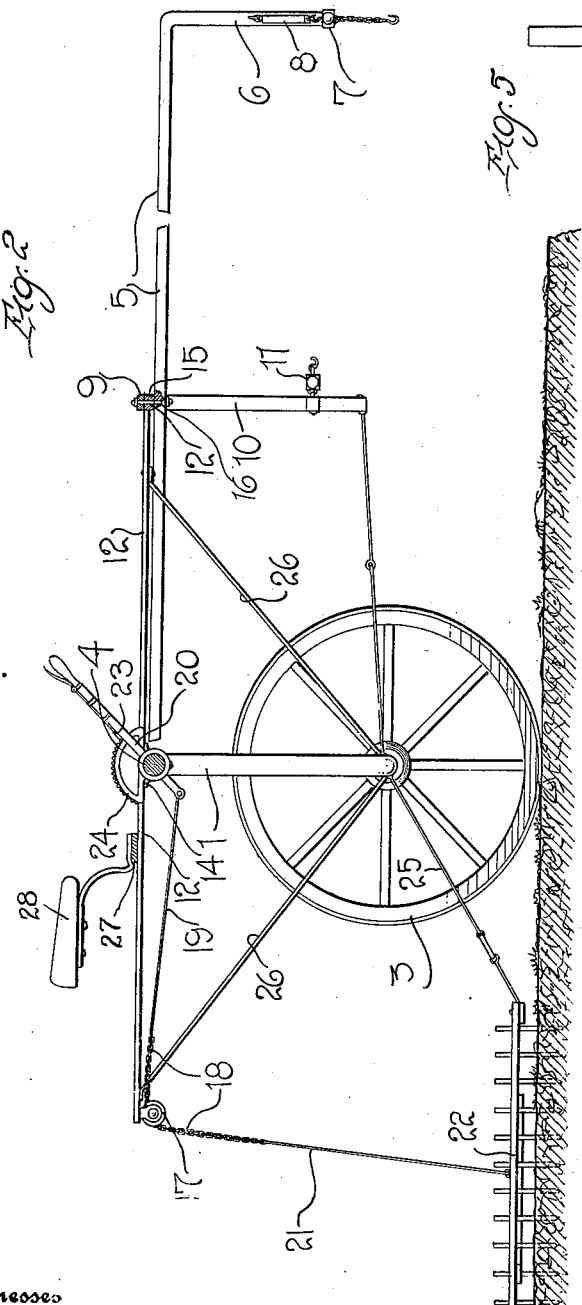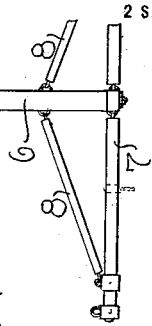

JOHN J. MATHEY AND THEODORE E. WILLIAMS, OF ROBEY, SOUTH DAKOTA.

AGRICULTURAL IMPLEMENT.

1,137,228.  Specification of Letters Patent.  Patented Apr. 27, 1915.

Application filed May 14, 1914. Serial No. 838,553.

*To all whom it may concern:*

Be it known that we, JOHN J. MATHEY and THEODORE E. WILLIAMS, citizens of the United States, residing at Robey, in the county of Aurora and State of South Dakota, have invented certain new and useful Improvements in Agricultural Implements, of which the following is a specification, reference being had to the accompanying drawings.

This invention relates to certain improvements in agricultural implements and has relation more particularly to a device of this character especially designed and adapted for use as a cultivator; and the object of the invention is to provide a device of this general character having novel and improved means whereby the same may be employed with convenience and facility after the plants, such as corn stalks, have reached such a height as to make the use of an ordinary cultivator impossible.

The invention consists in the details of construction and in the combination and arrangement of the several parts of our improved agricultural implement whereby certain important advantages are attained and the device is rendered simpler, less expensive and otherwise more convenient and advantageous for use, all as will be hereinafter more fully set forth.

The novel features of the invention will be carefully defined in the appended claims.

In order that our invention may be the better understood, we will now proceed to describe the same with reference to the accompanying drawings, wherein—

Figure 1 is a view in top plan, with certain of the parts in section, of an agricultural implement constructed in accordance with an embodiment of our invention; Fig. 2 is a longitudinal vertical sectional view taken substantially through the transverse center of the device as illustrated in Fig. 1; Fig. 3 is a fragmentary longitudinal vertical section through the cross arm of the supporting member herein disclosed; Fig. 4 is a view in bottom plan of the device as illustrated in Fig. 3; and Fig. 5 is a fragmentary view in front elevation of the draft tongue herein included.

As disclosed in the accompanying drawings, I denotes an arched supporting member having its lower extremities provided with the oppositely disposed trunnions 2, on which are adapted to be mounted suitable traction wheels 3. Projecting forwardly from the cross bar 4 of the arch member 1 is the draft tongue 5 of predetermined length provided with a depending portion 6 of requisite dimensions, the lower portion of which is provided with the oppositely directed laterally disposed yoke members 7 pivotally engaged therewith, for a purpose which is believed to be self-evident. At a predetermined point intermediate the length of the draft tongue 5 is disposed the evener bar 9 having the depending extremities 10 to which are suitably secured the swingletrees 11 which, in connection with the neck yokes 8, afford a convenient means whereby the requisite draft animals may be hitched to the machine and be properly positioned so as to travel between the rows of plants. Also suitably secured to the transverse bar 4 of the arch member is a substantially U-shape frame 12, the stems whereof are disposed rearwardly and secured intermediate their length, as indicated at 14, to the transverse bar 4 while the transverse bar 15 of such frame is suitably secured, as indicated at 16, to the draft tongue 5 at a predetermined distance in advance of the arch member. Suitably supported by the free extremities of the stems of the frame 12 are the pulleys 17 over which pass the flexible members 18, herein shown as link chains, the inner extremities of the members being suitably connected to the rods 19, which, in turn, are pivotally connected with the lower extremities of the levers 20 pivotally engaged intermediate their length with the transverse bar 4 while the opposite extremities of such flexible members 18 are engaged with the rods 21 which, in turn, are suitably engaged with the harrow members 22. Each of the levers 20 is provided with a conventional latch member 23 adapted to coact with the segmental racks 24 projecting upwardly from the frame 12 whereby it will be readily perceived that the harrow members 22 may be raised or lowered one independently of the other and effectively locked or maintained in their elevated position. The forward extremities of each of the harrow members are operatively connected with the trunnions or stub shafts 2 through the medium of the elongated links or rods 25, whereby it will be readily perceived that when the harrow members are in operative engagement with the ground proper, dragging movement will be imparted thereto as the machine is advanced.

In order to impart requisite rigidity to the frame 12, we find it of advantage to employ the forward and rear brace members 26 disposed between and operatively connected with the opposite extremities of the frame 12 and with the trunnions or stub shafts 2.

Supported by the frame 12 rearwardly of the supporting member 1 is the transversely disposed bar 27 with which is operatively engaged the seat structure 28 at a point substantially midway the length thereof.

From the foregoing description, it is thought to be obvious that an agricultural implement constructed in accordance with our invention is of an extremely simple and comparatively inexpensive nature and is particularly well adapted for use by reason of the convenience and facility with which it may be assembled and by reason of the effectiveness with which it performs its functions, and it will also be obvious that our invention is susceptible of some change and modification without material departure from the principles and spirit thereof and for this reason we do not wish to be understood as limiting ourselves to the precise arrangement and formation of the several parts herein shown in carrying out our invention in practice.

We claim:

1. A device of the character described comprising an arched supporting member having a cross arm, a draft tongue connected with the cross arm of the member, a frame substantially U-shape in form operatively connected with the cross arm and with the draft tongue, such U-shape frame having its stems disposed rearwardly, an agricultural implement, a connection between such implement and the supporting member, a second connection between the implement and the member coacting with the frame, and means for adjusting the last named connection for elevating the implement.

2. A device of the character described comprising an arched supporting member having its extremities provided with oppositely directed trunnions and having a cross arm, traction wheels mounted on such trunnions, a draft tongue operatively connected with the cross arm of the supporting member and provided forwardly thereof, a substantially U-shape frame connected to the cross arm of the supporting member and to the tongue in advance of such member, the stems of such frame being disposed rearwardly, an agricultural implement, a connection between such implement and a trunnion of the supporting member, a lever mounted for rocking movement on the cross arm of the supporting member, a connection between such lever and the agricultural implement, and a guiding means for such last named connection carried by the rear portion of the frame.

3. A device of the character described comprising an arched supporting member having a cross arm, a draft tongue connected with the cross arm of the member, a frame substantially U-shape in form operatively connected with the cross arm and with the draft tongue, such U-shape frame having its stems disposed rearwardly, an agricultural implement, a connection between such implement and the supporting member, a second connection between the implement and the member coacting with the frame, means for adjusting such last named connection for elevating the implement, and a seat structure carried by the frame rearwardly of the supporting member.

In testimony whereof we hereunto affix our signatures in the presence of two witnesses.

JOHN J. MATHEY.
THEODORE E. WILLIAMS.

Witnesses:
  A. H. HEMEOUS,
  A. ROSSMAN.

Copies of this patent may be obtained for five cents each, by addressing the "Commissioner of Patents, Washington, D. C."